United States Patent Office 2,925,711
Patented Feb. 23, 1960

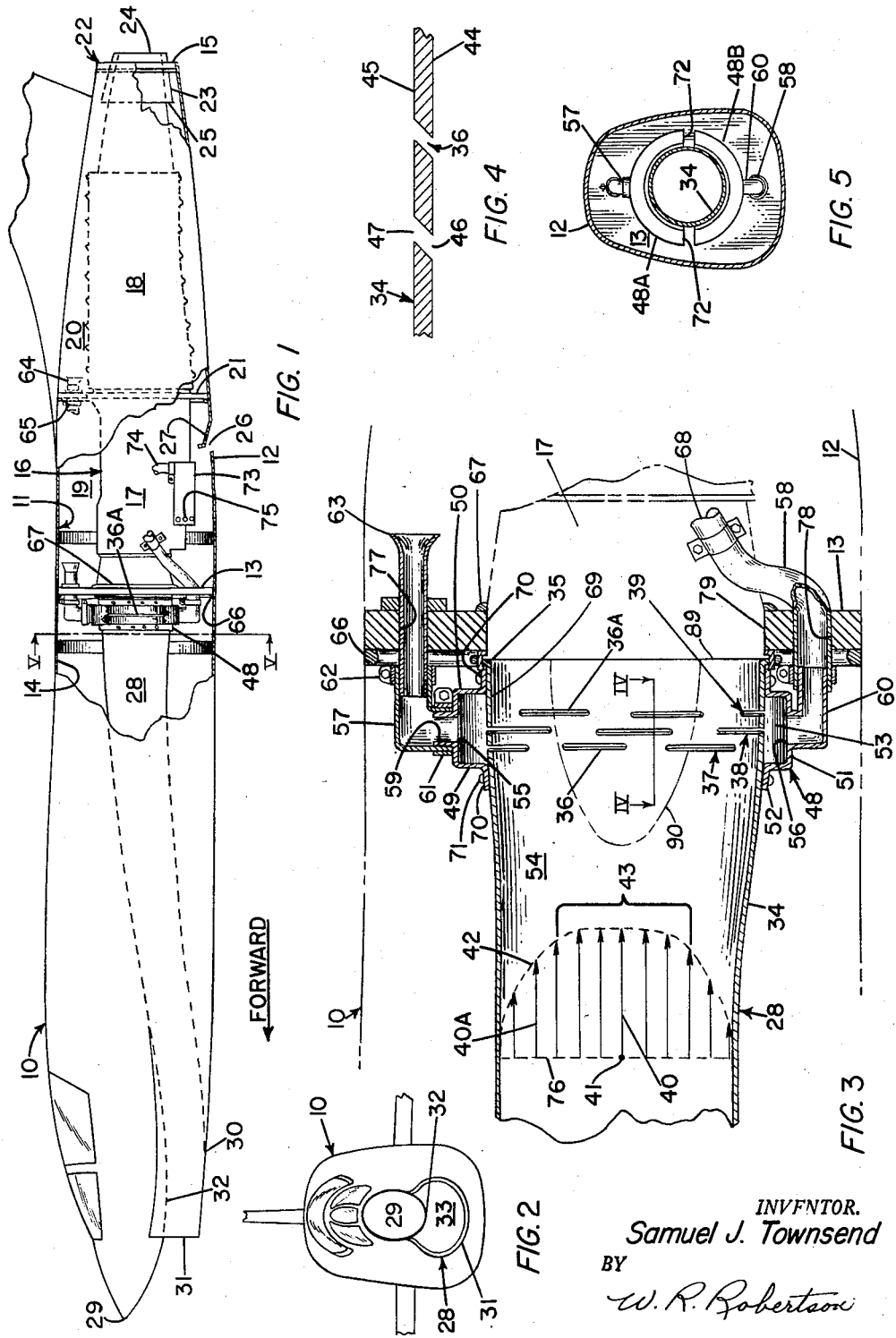

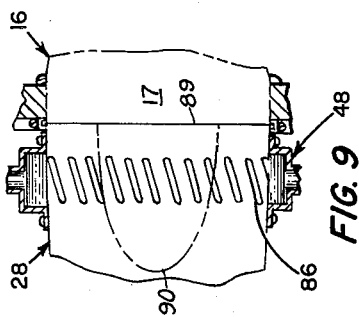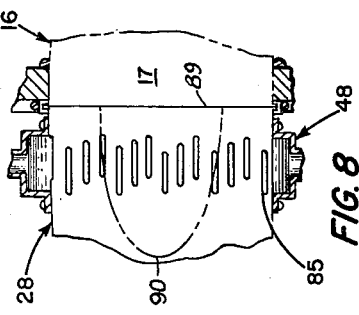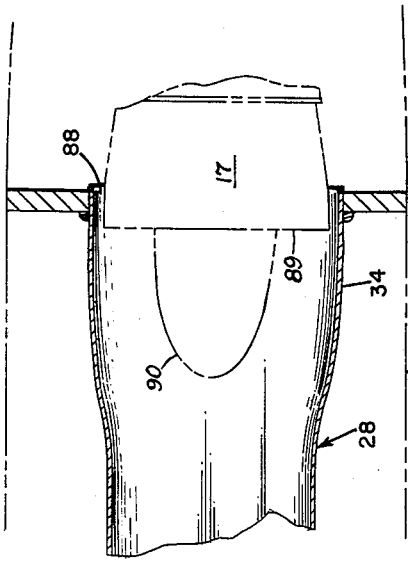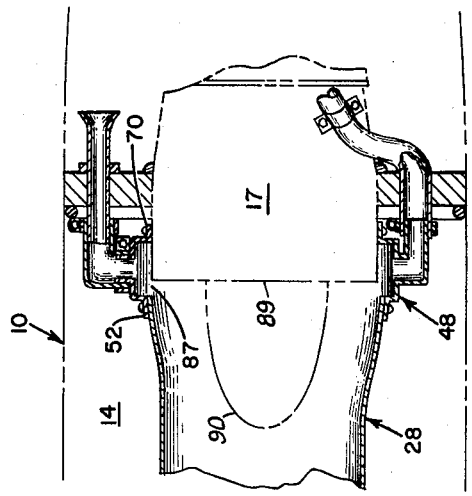

2,925,711

MEANS FOR IMPROVING TOTAL PRESSURE DISTRIBUTION AND VALUE IN AIR SUPPLIED TO A JET ENGINE

Samuel J. Townsend, Dallas, Tex., assignor to Chance Vought Aircraft, Incorporated, Dallas, Tex., a corporation of Delaware Application June 11, 1956, Serial No. 590,490

9 Claims. (Cl. 60—35.6)

This invention relates to improvements in air induction means for jet engines operable for propelling aircraft and the like at high velocities, and more particularly to means for improving the total pressure distribution and value in the air which an airframe-mounted ram air inlet duct supplies to a jet engine.

The important design objectives for any air induction system supplying air to an aircraft jet engine include the delivery of air to the engine compressor with minimum losses in total pressure occasioned by external phenomena such as airframe boundary layer and shock effects, and further with minimum internal losses traceable to the effects of friction, diffusion, bends, etc. within the duct, the term "total pressure" being employed herein to represent the static pressure plus the velocity pressure of the air passing from the duct into the upstream end or face, of the engine compressor. (By the term "face of the compressor" there is meant the location downstream of which the air supplied to the engine may be said to have already entered the compressor of the engine and upstream of which the air may be said to have not yet reached the compressor.) These objectives, which of course should preferably be achieved with minimum addition to the aircraft's over-all drag and without deleterious effect on airframe and duct structural efficiency, are not always compatible with each other; consequently, the design of an optimum air induction system for a particular jet engine mounted in a particular airframe is ordinarily aimed at obtaining the best possible balance among many factors, and represents a compromise between the varying, sometimes opposed, demands of a number of criteria.

It is generally desired in any air duct that the duct should deliver air to the jet engine at a total pressure value which, as nearly as may be achieved, is high enough to induce a mass-flow of air through the engine which will permit the production of optimum propulsive thrust by the engine. The delivery of air at high total pressure is not, however, all that is required of the duct; it is important, in order that the engine may operate at its best efficiency, that the distribution of the total pressure of the air should be uniform in the sense that, in cross-section at the engine compressor face, there should be minimum variation in air total pressure radially from, as well as circumferentially about, the engine compressor face's center. Since engine thrust generally is proportional to mass-flow of air through the engine, and since mass-flow is dependent, other factors remaining equal, upon the velocity pressure of air at the compressor face, areas of low-velocity air which may exist in either a circumferential or radial sense at the compressor face tend to penalize engine performance to an extent which is related to the sizes of the low-velocity areas and to the values by which their velocities may be said to be low.

Shock waves in patterns which may unevenly affect airflow at or near the duct inlet, the effects of duct bend and diffuser contours, and various other physical aspects and relations of the air induction system usually result in some circumferential inequalities in total pressure at the compressor face. For instance, where part of the duct stream tube enters the duct ram inlet opening after passing through a shock wave pattern containing an oblique shock wave, while another part enters after having passed only through a normal shock wave, the air having entered through the oblique shock wave will ordinarily be of the higher total pressure. Viewing the duct in cross-section, the air in one part will thus be travelling at a particular rate, while that in a circumferentially different part will travel at still another rate, and this difference in velocity, hence in total pressure, will in some degree persist down the length of the duct so that at the duct's downstream end there will be some velocity pressure inequalities in air of circumferentially different locations.

As air flows through any duct, friction occurs between the inner surface of the duct wall and the periphery of the airstream flowing through the duct, and this friction tends to slow the peripheral air. As air has a certain viscosity, this slowing by friction (hence, reduction of total pressure) of the air nearest the duct wall is transmitted radially inward in progressively diminishing degree to air flowing nearer the duct center. As a result, the air of highest velocity relative to the engine is found at or about the duct's center, while radially outward, toward the duct wall, the air is of progressively lower velocity and total pressure, and may tend to show increased turbulence. The longer the duct, the further the air generally must flow along the duct wall, hence the greater the reduction in velocity pressure and smoothness of the air nearer the duct wall. Because of this effect, aircraft are often provided with relatively short ducts with inlets at the aircraft's sides, and the various disadvantages of such ducts, such as their greater tendency toward certain airflow instabilities, the added complications and expense of the fuselage boundary layer disposal provisions which their use generally requires, the frequently higher energy losses which occur at the sharper bends which often are required in the shorter ducts, etc. are accepted as less advantageous than the losses attributable to friction of air along the wall of a longer duct; otherwise, a longer duct, which permits of a ram inlet at or near the aircraft's nose, and which does not in most cases require either extensive bends or fuselage boundary layer disposal provisions, may be adopted and the velocity-pressure losses along the wall thereof accepted as unavoidable.

By means of the present invention, duct air velocity losses attributable to wall friction may virtually be obviated in air ducts of any length likely to be used in an aircraft, and long ducts may be made, in this respect, virtually as efficient as shorter ducts. The invention removes low-velocity air from the duct immediately upstream of the engine compressor face, thus leaving only high-velocity air in the duct for delivery to the engine. To compensate for the mass-flow of removed air, the duct is made large enough to supply adequate air, after the removal of low-energy air therefrom, to the engine. Removing the low-velocity air from the duct not only increases the velocity pressure of air at the compressor face; tests have shown that it also markedly improves the uniformity of the velocity pressure distribution at that location. The invention thus has maximum benefit on engine air mass-flow, hence on engine thrust.

A factor affecting the total drag upon an aircraft, and hence the net thrust of the aircraft's engine or engines, is the source and manner of obtaining, and the manner of ejecting from the airframe, the airflow utilized in the airframe for cooling, ventilation, operation of certain air-actuated mechanisms, etc., which sort of airflow will for convenience be hereinafter designated as "utility" air or airflow. The relative speed of the aircraft makes the airstream about it an excellent and readily accessible source of utility air. On very high-speed aircraft, however, special ram air scoops for collecting air for utility purposes are undesirable because of their addition to the over-all drag of the aircraft: since utility air inducted from the airstream ordinarily must experience some slowing within the airframe before it is ejected therefrom, the net propulsive thrust available from the engine is reduced by the amount of energy required for effecting such momentum changes in the utility air. The present invention makes use of lower-energy air, removed as described above from the air duct, as a source of utility air, and the removed air is preferably passed from the aircraft while moving rearwardly relative thereto and at airframe locations where the outside air pressure is low; consequently, discharge of the air overboard is accompanied by as small a drag penalty as possible. As the drag which may be attributed to the induction and discharge overboard of the removed air is not appreciably increased by use of the air, after its removal from the duct, for utility purposes within the airframe, such use is virtually of no drag penalty whatever, and in comparison with the drag penalty imposed by special scoops for taking utility air from the airstream, effects a distinct reduction in net drag.

In brief, the invention includes: an air duct having a forwardly facing ram air inlet at its upstream end and communicating at its downstream end with the compressor face of a jet engine, the duct further having communication, at the compressor face, with an area outside the duct and engine for passing into said area a peripherally located lower-energy fraction of an airstream passing through said duct; and air disposal means including airframe openings for discharging from the airframe the air passed from the duct into the area outside the duct and engine. To provide the above-mentioned communication between the duct and the area outside the duct and engine, the downstream end of the duct, at the engine compressor face and about all or some part of its periphery, may be separated by one or more gaps or slots from the upstream end of the engine air receiving means, for example the forward end of the compressor case where a turbo-jet engine is employed. Where multiple slots or gaps are employed, the downstream end of the duct may be directly joined to the upstream end of the engine air-receiving means and the slots may take the form of a circumferentially disposed series of openings. In either event, the one or more slots or the openings must be located at (i.e., in the very near region of) the compressor face. In some applications, the peripheral, lower-energy air may be discharged through the one or more gaps or slots directly into the airframe compartment enclosing the downstream end of the duct; otherwise, an air receiving vessel may be provided on the duct exterior for receiving the lower-energy air and for maintaining structural continuity of the duct in the area of the one or more slots or gaps. One or more exit openings should be provided in the air receiving vessel, and to the exit openings may be connected air conducting means, such as conduits, for conveying air from the vessel to desired points in the airframe for use therein for cooling and/or other utility purposes.

It is accordingly an object of this invention to provide means for improving the velocity pressure value of air at the compressor face of a jet engine receiving air from an air duct mounted in an aircraft propelled by the engine.

Another object is to provide means for improving the uniformity of velocity pressure distribution of air at the compressor face.

A related object is to provide means for removing air of comparatively low velocity pressure from the air duct while leaving air of higher velocity pressure in the duct for delivery to the jet engine.

Yet another object is to provide means for receiving air removed as stated from the duct and for diverting the removed air into predetermined flow routes away from the duct.

Still another object is to provide air conducting means for directing and conducting said removed air away from said air receiving vessel to predetermined points in and about the airframe.

A further object is to provide air disposal means which discharges said air overboard in a manner imposing minimum aerodynamic drag upon the aircraft.

A still further object is to provide air conducting means of the character stated which routes said air through the airframe air in a manner whereby the airflow is profitably employed in the airframe for cooling, ventilating, and like utility purposes while imposing little or no added net drag upon the airframe.

An additional object is to provide means of the character thus far specified which are entirely automatic in operation, simply and ruggedly constructed, and light in weight.

Other objects and advantages will be apparent from the specification and claims, and from the accompanying drawings which illustrate an embodiment of the invention.

In the drawings which accompany and form a part of this specification, and in which like numerals are employed to designate like parts throughout the same, Figure 1 is a side elevation of an aircraft employing a representative form of the present invention, some of the aircraft fuselage and a portion of the air duct and of the vessel of the invention being cut away, and the wing and certain other parts of the aircraft and of the engine being omitted for simplicity and clarity of representation;

Figure 2 is a front elevation of the aircraft fuselage showing the ram air inlet of the engine air duct;

Figure 3 is a central vertical longitudinal section through the air duct and vessel at the duct aft end, the outlines of adjacent parts of the fuselage and of the engine being shown in phantom line, with which sectional view is combined a diagram showing an example of velocity pressure distribution in air at various points radially displaced from the duct central axis at a location immediately upstream of the vessel;

Figure 4 is a horizontal longitudinal section taken on line IV—IV of Figure 3 through the wall and two of the air removal openings of the air duct;

Figure 5 is a cross-sectional view taken on the line V—V of Figure 1;

Figure 6 is a sectional view similar to Figure 3 and showing an arrangement employing spacing of the downstream end of the duct from the upstream end of the engine and omitting the air receiving vessel and conducting means;

Figure 7 is a view generally similar to Figure 6 wherein the air receiving vessel and conducting means are employed;

Figure 8 is a central vertical longitudinal view of the downstream end of the duct showing an alternate mode of forming the duct wall openings; and Figure 9 is a view similar to Figure 8 showing still another mode of forming the duct wall openings.

Referring now to the drawings, with initial reference to Figure 1, there is shown by way of example an aircraft, the aft portion of whose fuselage 10 contains an engine compartment 11 bounded on its generally longitudinally extending sides by the fuselage skin 12, at its forward end by a transverse partition or bulkhead 13 which separates the engine compartment 11 from forward portions 14 of the fuselage interior, and at its rear end by a transverse partition or bulkhead 15 closing off the engine compartment 11 from the ambient air. In a so-called one-zone engine installation, the engine compartment 11 is not further divided, and remains a single compartment in which an engine 16 for propelling the aircraft is installed. Where, as is frequently the case, it is desired as a fire precaution and for other reasons to isolate the engine's forward section 17 from its aft section 18, the engine compartment 11 is divided into forward and aft sections 18, 20 by means of a transverse partition or bulkhead 21 extending across the fuselage 10 at a location intermediate between the forward and aft bulkheads 13, 15, the exact location of the intermediate bulkhead 21 being determined by the construction and dimensions of the engine 16 and fuselage 10. While any turbojet engine is employable in conjunction with the present invention as long as the relation, herein shown and described, between the engine compressor face and the one or more slots or openings communicating between the interior and exterior of the air duct is preserved, the engine 16 shown by way of example is readily recognized, by its outline, as a J-57 engine. As is well known in the art, this engine 16 has a forward portion 17 including an engine compressor case whose forward end 89 is substantially in register with, or very slightly forward of, the leading edges of the inlet guide vanes of the engine compressor. The line 89 of the drawing thus well represents both the compressor face of the engine 16 and the compressor case forward end. Meanwhile, it is desired to call attention at this point to the term "engine air receiving means," which term is later employed herein with reference to the compressor case whose forward end is located at 89.

The aircraft receives propulsive thrust from the jet engine 16 which is securely mounted within the engine compartment 11 on fuselage structural members (not shown). The forward partition or bulkhead 13 may vary in its position relative to the engine 16; in the example shown, the engine extends slightly into the fuselage compartment 14 forward of the bulkhead 13 through a bulkhead opening 79 (Figure 3) providing the necessary clearance. The engine 16 passes through similar openings in the intermediate and aft partitions or bulkheads 21, 15, and at its aft end may extend somewhat beyond the aft end 22 of the fuselage.

Sealing provisions 66, 67 between the forward bulkhead 13 and the fuselage skin 12 and between the engine 16 and the forward bulkhead 13 prevent airflow between the engine compartment 11 and the fuselage compartment 14.

Similar provisions are made at the aft bulkhead 15 for preventing airflow out of the engine compartment 11 through any gaps which might occur between the aft bulkhead 15 and the fuselage skin 12, and also may be employed in analogous locations at the intermediate bulkhead 21 to prevent the interchange of air between the forward and aft engine compartments 19, 20 in cases where engine and/or other design criteria require installation of the intermediate bulkhead 21.

The space lying outside the engine 16 and within the engine compartment 11 is thus entirely enclosed in a manner which, except for the openings comprised by air conducting and disposal means to be described, preferably is entirely airtight. Where a two-zone engine installation is employed, the intermediate bulkhead 21 is installed, and the resulting forward and aft sections 19, 20 of the engine compartment 11 are thereby isolated and preferably sealed from each other. The air conducting means will be discussed in later paragraphs; the air disposal means, first as employed in a one-zone engine installation and second as in a two-zone installation, will now be described.

In flight, a considerable airflow whose source and nature will be described in later paragraphs is released into and must be continuously discharged from the engine compartment 11; hence, an air disposal opening or openings must be provided through the airframe exterior surface into the compartment 11 to permit flow of air therefrom into the outside air. In order that the flow of air overboard may be accompanied by as small an addition to overall drag as possible, it is desirable that the air should move rearwardly as it is discharged, and it is generally preferable that the discharge opening or openings should be located where the outside air pressure is relatively low.

In the example, a tubular, open-ended sleeve or ejector 23 which substantially fills the engine clearance opening provided in the aft bulkhead 15 is mounted in generally concentric, outwardly spaced relation to the aft end of the engine 16. The forward end of the ejector 23 extends a short distance forward of the aft bulkhead 15 into the engine compartment 11, and, in the particular example shown, its aft end is approximately in register with the aft end of the engine exhaust nozzle 24, still other points of termination of the ejector relative to the aft end of the nozzle 24 of course being practical and effective. The annular space between the engine and the ejector constitutes an exhaust passage 25 through which the engine compartment 11 is in open communication with the atmosphere. As mentioned above, any gaps between the web of the aft bulkhead 15 and the ejector 23 preferably are sealed in an airtight manner. Because of its location, and because of the velocity of engine exhaust gases passing through the engine exhaust nozzle 24, the air pressure outside the airplane at the aft end of the exhaust passage 25 is relatively low; furthermore, air from the engine compartment 11 travels almost directly aft in passing overboard through the exhaust passage 25. The arrangement just described is therefore quite effective as a low-drag means of exhausting air from the engine compartment 11. The invention is not limited to use, however, in aircraft provided with ejectors, but is quite effective, for instance, where no ejector is provided and a simple opening in the bulkhead 15 permits airflow from the engine compartment 11 into the atmosphere. Further, where for some reason discharge of air through the bulkhead 15 is not desired, such is not necessary to efficient operation of the invention as long as adequate openings are provided in other locations for the discharge of low-energy air bled from the air duct 28.

To provide an additional opening for the discharge of air overboard from the engine compartment 11, the fuselage skin 12 is pierced by an exhaust opening 26. One or more openings such as 26 may be employed; their use is generally optional where a one-zone engine installation is made and the compartment 11 is undivided, the entire compartment 11 then being served by the exhaust passage 25, where such is used, lying between the ejector 23 and engine 16.

Where a two-zone installation is employed, the intermediate bulkhead 21 is installed, and provision must be made for overboard discharge of air which, as will be described, is released into the engine compartment forward section 19. Such provisions may well take the form of one or more overboard exhaust openings through the fuselage skin such as the opening 26 shown. The opening or openings 26 serving the engine compartment forward section 19 must of course be located forward of the intermediate bulkhead 21, and preferably should be located where, in high-speed flight, the air pressure about the airplane exterior is as near zero as possible. Drag penalty of air exhausted through the opening 26 may further be minimized by causing the air to flow in a generally rearward direction before and while leaving the airframe. This is accomplished by a deflector vane or baffle 27 continuous with or rigidly and smoothly attached to the skin 12. The baffle 27 extends inwardly and forwardly, relative to the fuselage 10, from the aft edge of the overboard exhaust opening 26.

The air required by the engine 16 for producing propulsive thrust is taken from the atmosphere and is supplied to the engine by a tubular air duct 28. Its interior communicating with that of the engine 16, the duct 28 at its aft end is connected in an airtight manner to the forward end of the compressor casing of the engine 16, extends well forwardly and generally downwardly therefrom through the fuselage 10, and emerges through the fuselage lower skin 12 at a point 30 below and not far aft of the forward end of the fuselage nose 29, other routings of the duct 28 being, of course, entirely feasible. In the present example, the lower-side contours of the duct 28 and fuselage 10 jointly blend and merge at the point 30 where the lower side of the duct 28 leaves the fuselage; from its emergence point 30 to its forward edge or rim 31, the lower-side contour of the duct 28 is in a sense a continuation of that of the fuselage 10. The top of the duct 28, at its forward end 31 and for a short, rearwardly extending distance therefrom, is entered by a portion 32 of the lower-side contour of the fuselage nose 29; in effect, throughout this distance, the upper, inner surface of the duct 28 serves also as the lower, outer surface of the fuselage nose 29. By common, well-known means not shown, the engine air duct 28 is firmly and securely attached to fuselage fixed structure both where the duct extends outside the fuselage 10 and where it is contained within the fuselage.

With reference to Figure 2, the forward edge or rim 31 of the duct 28, in cooperation with the adjoining lower surface 32 of the fuselage nose, defines and encloses a forwardly directed duct inlet opening 33. Because of ram effects, air having during flight entered the duct 28 through the ram inlet opening 33 has a total pressure which is higher than that of ambient air. As explained previously, it is much to be desired that the total pressure of air passing from the duct 28 into the engine compressor should be uniform and, up to a value inducing optimum mass-flow of air through the engine 16, as high as possible. Referring also to Figure 1, the duct 28 is comparatively long and extends well forwardly of the engine; consequently, it may be expected that before the air inducted through the ram inlet opening 33 reaches the engine compressor, air flowing against and adjacent the wall of the duct 28 will have suffered considerable velocity pressure loss as explained previously. In addition, the air adjacent the duct wall may, before reaching the engine compressor, have acquired some turbulence, and also its velocity pressure distribution may be uneven. The mode of construction of the duct 28 whereby the lower-energy, possibly turbulent air flowing near the duct wall is removed from the duct 28, while the more central, higher-energy air is left in the duct for delivery to the compressor of the engine 16, will now be described.

With reference to Figure 3, the wall 34 of the duct 28, at least at and near the duct's aft end 35, is preferably of a single thickness and is pierced by an air removal opening or openings 36 communicating between the interior and exterior of the duct 28. Where, as in Figure 1, only one opening 36 is provided, it should preferably extend entirely or substantially around the duct 28, structural continuity of the duct in such case being preserved by the air receiving vessel to be described in later paragraphs. A convenient and effective form of the duct wall openings 36 is the form shown in Figure 3 wherein a plurality of circumferentially disposed openings 36 through the duct wall are arranged in mutually staggered relationship in a plurality of annular rows 37, 38, 39 extending around the circumference of the duct 28 close against its downstream end 35. As in Figure 3 the duct 28 is shown in longitudinal vertical central section, only the openings 36 in the right-hand side of the duct wall 34 are visible; in interpreting the drawing, it will be understood that the right-hand side of the duct wall 34 may be typical also of the left-hand side, which in the drawing is cut away; and that similar, uniformly spaced openings such as 36 may be provided in the multiple rows 37, 38, 39 around the entire duct circumference.

As the air pressure in the duct 28 is considerably higher, because of ram effect, than ambient air pressure, and as the engine compartment 11 or forward and aft sections 19, 20 thereof are in open communication with ambient air in locations where the outside air pressure is relatively low, said communication being through openings such as provided by the compartment air exhaust passage 25 at the aft end of the fuselage 10 and the opening or openings 26 through the fuselage skin 12, air will readily flow from the duct 28 through the duct wall openings 36, into the compartment 11 or compartment sections 19, 20, and overboard through the exhaust passage 25 and opening(s) 26 if means are provided for placing the duct wall openings 36 in communication with the compartment 11 or compartment sections 19, 20. Such means, comprising an air receiving vessel and an air conducting means, are provided, and will be explained in detail in later paragraphs. The duct wall openings 36 should be placed at the compressor face, i.e., as near the forward end 89 of the compressor case of the engine 16 as is practicable, in order that no significant slowing or turbulence of duct air attributable to friction between the air and the duct wall may occur downstream of the openings 36. Hence, the openings 36 are preferably located well downstream of the forward end of the central body or fairing, ordinarily employed for guiding airflow to the blades of an axial-flow compressor, shown at 90 in each of the figures in which it appears, and spaced upstream from the compressor face by an interval no greater than half the diameter of the air duct 28 at the aft end of the latter.

The arrows 40 shown in Figure 3 represent, in diagrammatic fashion, the velocity of air at different locations varying in radial displacement from the longitudinal centerline of the duct 28, which centerline passes through the point 41; and the dotted line 42 across the duct 28 at the heads of the arrows 40 is a duct air velocity curve helpful for visualization of the velocity trend shown by the arrows. The dotted line 76 across the duct at the bases of the arrows is a reference line indicating zero velocity of air within the duct 28. Higher velocity of air at a particular flowline within the duct 28 is shown by further extension of the arrows 40, as well as of the curve 42, from the reference line 76 toward the aft or downstream end 35 of the duct; radial distance of the particular flowline from the duct centerline is indicated by the vertical distance (on the illustration) of a respective arrow or point on the curve by which the flowline is represented from the point 41. The diagram shows that a centrally located rod-like core portion 43 of the duct volume contains air of relatively high velocity, while the peripheral air—that is, the duct airflow outside the central core 43—is, toward the duct wall 34, of progressively lower velocity. As will be explained, static air pressure in the duct 28 is greater, when the aircraft is in flight, than is the static pressure of air outside the duct 28 in the vicinity of the duct wall openings 36; hence, air may be expected to flow out of the duct 28 through the openings 36. As the low-velocity air in the duct, indicated by the shorter arrows 40A outside the core 43, is the nearer to the openings 36, it is this air which flows out of the duct 28 through the openings 36, while the more centrally located air 43, because of its higher velocity and momentum and its greater distance from the openings 36, flows on through the duct 28 and into the engine 16. As the openings 36 are at, i.e., in register with or are only very slightly upstream of, the upstream end of the compressor face, no significant amount of friction with the wall of the duct 28 occurs in the duct air downstream of the openings 36; the air delivered to the engine 16 is of high velocity pressure; and, as tests have shown, velocity pressure distribution, both circumferentially around as well as radially about the central axis of the compressor face, is much improved.

The size and distribution of the openings 36 in the duct wall 34 is a function of the mass-flow of low-energy air to be removed from the duct 28, and also is a factor determining the closely related radial thickness of the cylindrical, peripheral airflow removed from about the air-stream's core 43 of higher-energy air. Complete annularity of each row 37, 38, 39 of openings 36 is desirable, but their annularity may to a considerable extent be interrupted, where necessary because of interference with structural members or items of airframe or engine equipment, or for other reasons, and the effects of the partially annular rows 37, 38, 39 of openings 36 will be found distinctly beneficial in the ways outlined above. In the same way, it is preferable that the openings 36 be of a uniform size and spacing; yet, if some circumstance so requires, their size and their spacing about the periphery of the duct 28 may be varied somewhat without such extensive loss of their benefits as to nullify their value to the air induction system, and irregularity in size and spacing may even prove beneficial, where appropriately employed, in a duct with serious differences in velocity pressure in various areas or sections around its circumference: that is, where openings of uniform size and spacing do not eliminate a particular area of low velocity pressure at the compressor face, duct wall openings proportionally larger and/or more closely spaced than the openings 36 shown may be used with good effect to remove more low-velocity air from the duct in the region of that area, and so to improve the velocity pressure distribution in the air supplied to the engine. In any event, openings 36 must be provided in sufficient size and number to serve a considerable portion of the duct airstream's circumference, otherwise the benefits of the invention will be lost. For instance, the provision of one, or even two or three, small openings 36 which serve only a corresponding number of small, localized duct airstream areas will not efficiently accomplish the purposes of the invention; they will remove air from the duct 28, but not with any worthwhile beneficial effect on velocity pressure distribution or value at the downstream end 35 of the duct.

Where only one row of openings 36 is used, one of the openings 36 may be so elongated circumferentially of the duct 28 as to extend largely or entirely around the latter, in which case a segment 69 at the aft end 35 of the rearward portion of the duct 28 will virtually or actually be severed from the main body of the duct 28. The manner in which duct continuity may in such case be maintained will be explained in a following paragraph. The shape of the openings 36, where multiple openings are used, may vary. In the preferred form illustrated, the openings 36 are of slot-like form, and their longer axes extend circumferentially of the duct wall 34. A staggered relationship between the openings 36 of a plurality of rows 37, 38, 39 ensures that air may be removed evenly from around the entire duct circumference. Referring to Figure 4, the openings 36, two of which appear in the referenced figure, extend through the duct wall 34 from its inner surface 44 to its outer surface 45. So that air passing out of the duct 28 through the openings 36 will retain much of its rearward momentum and thus experience minimum resistance to its escape from the duct 28, the openings 36 are preferably slanted rearwardly from their inner ends 46 to their outer ends 47.

Other modes of forming the duct wall slots are entirely conceivable. For example, in Figure 8, the openings 85 through the wall of the duct 28 are elongated in a direction parallel to the lengthwise axis of the duct, while in Figure 9 the axes of the slots 86 have a fore-and-aft slant. While desirable for maximum removal of low-energy air in proportion to slot size, the slot walls need not always be slanted rearwardly in the manner shown in Figure 4. In all cases, however, the openings or slots should be, as shown in the various figures of the drawing, at the compressor face.

The mass of lower-energy air bled from the duct 28 during flight of the aircraft is considerable, and greatly exceeds a mere removal of the boundary layer; by way of general illustration, the mass-flow of the bled air, in a particular aircraft, may reach 25% of the total mass-flow of air through the duct. Under many circumstances, this rather large airflow cannot be loosed indiscriminately into the fuselage 10 without creating serious problems; hence, provisions must often be made for receiving the airflow, routing it through the airframe, and discharging it overboard in the most advantageous fashion. Referring to Figures 1 and 3, airflow from the duct 28 through the duct wall openings 36 may be received by a vessel 48. The vessel 48, as seen in section in Figure 3, is approximately U-shaped; that is, the vessel 48 has forward and aft side walls 49, 50 positioned generally normal to the duct wall 34, and these side walls 49, 50 are connected and the interval between them is closed by an outer wall 51 which is generally parallel, in a fore and aft direction, with the duct wall 34, being spaced therefrom by the width of the side walls 49, 50. The side walls 49, 50, at their respective edges adjacent to the duct 28, have flanges 52, 70 which lie flat against and are rigidly attached, as by rivets 71, to the duct wall 34. Where the duct wall openings 36 extend entirely around the duct 28, the vessel 48 completely encircles the duct and thus encloses an annular chamber 53 bounded by the vessel side walls 49, 50, the vessel outer wall 51, and the outer surface of the duct 28 where covered by the vessel. Sealing compound, gaskets, or other appropriate and efficient means should be employed to effect a seal between faying surfaces of the duct wall 34 and the flanges 52, 70 in order that the annular chamber 53 shall be made entirely airtight except for certain openings which are herein specified. The vessel 48 must be made wide enough in a fore-and-aft sense to cover (but not obstruct) the duct wall openings 36 through which there is communication between the duct interior 54 and the annular chamber 53.

Where duct wall openings 36 are not provided entirely around the duct 28, the vessel 48 may comprise one or more segments such as 48A, 48B (Figure 5) which extend around only such part or parts of the duct periphery as necessary for covering as many openings such as 36 (Figure 3) as may be provided in the duct wall 34; in such case, each vessel segment 48A and/or 48B must be provided with airtight end walls 72 to prevent the escape at its ends of air passed into the segment 48A and/or 48B through the duct wall openings 36. Where one opening such as 36A is made to extend substantially or entirely around the circumference of the duct 28 (as shown at 36A in Figure 1), the virtually or actually annular slot 36A substantially or completely severs the short duct segment 69 (Figure 3) aft of the opening 36A from the main body of the rearward portion of the duct 28. As the vessel's forward and aft flanges 52, 70 are rigidly attached respectively to the rearward portion of the main body of the duct 28 and to the duct short segment 69, the manifold 48 in such case imparts continuity to the duct 28 in that, through the manifold 48, the short segment 69 is attached to the main body of the duct 28.

Where, as in Figure 7, the downstream end of the duct 28 is slightly separated from the upstream end of the engine 16 to provide therebetween a single continuous slot 87 for the discharge of low-energy air from the duct, the manifold 48 may be attached to the duct aft end at the manifold forward flange 52, and the aft flange 70 of the manifold may be rigidly or flexibly attached by any suitable means to the forward end of the engine 16, the manifold 48 thus serving not only as an air-receiving means for air removed from the duct 28 but also as a connection between the duct 28 and the air-receiving means of the engine 16.

In applications where a large airflow is beneficial or tolerable in the compartment containing the downstream end of the air duct, the manifold may be omitted as shown in Figure 6 wherein, to provide another example of an air discharge opening arrangement, the aft edge of the duct wall 34 has a substantial radial displacement as well as an axial displacement from the forward end of the air-receiving means of the engine 16 to form an annular opening 88 through which lower-energy air flows directly from the duct into the compartment 14.

Reference is again made to Figure 3. For a continuous flow of lower-energy air to pass from the duct 28 through the wall openings 36 into the vessel chamber 53, provision must be made for exhausting air from the chamber 53. One or more openings should be provided for this purpose in the vessel outer wall 51 or side walls 49, 50. In the preferred form of the invention, the vessel 48 has in its outer wall 51 an upper opening 55 and a lower opening 56 into which lead upper and lower nipples 59, 60 which may be angled to conform to the directions in which it is desired for conduits of the air conducting means (to be described) to leave the vessel 48 and which may be formed integrally with the vessel or may be rigidly attached thereto in any firm, airtight manner, for instance, by welding.

The air conducting means, which will now be described, includes, in the example shown, upper and lower conduits or hoses 57, 58 which are respectively attached by appropriate means such as the clamps 61 to the upper and lower nipples 59, 60 of the air receiving vessel 48. The lower hose 58 is shown to be broken away at a point 68 not far aft of the vessel 48 to indicate that the lower hose 58 may be routed to any of a number of possible airframe locations, as will be further discussed.

Many arrangements of the hoses 57, 58 are possible; a simple one which is entirely effective in disposing of the air removed from the duct 28 includes connecting the hoses 57, 58 directly to overboard vent fittings having fuselage skin openings through which bled air is disgorged overboard. The removed air may find many uses in the airframe, however, if not conducted directly overboard, and is especially useful for cooling and ventilating and other utility purposes. For example, in a one-zone engine installation (which omits the sealed intermediate partition or bulkhead 21), the upper hose 57 may be attached by a clamp 62 to a tubular air release fitting 63 which extends through a clearance opening 77 in, and is rigidly mounted on, the forward bulkhead 13. The end of the fitting 63 extending forward of the bulkhead 13 must be of proper size and shape for receiving the upper hose 57, while the end extending briefly aft of the bulkhead 13 may be of any shape, such as a flared or bell-mouthed shape, which effects a desired dispersion and flow-direction of air released through the fitting 63 into the engine compartment 11. Air from the vessel 48 thus may flow through the upper hose 57 and the air release fitting 63 into the engine compartment 11, through the compartment 11 for cooling and ventilating the same, around the engine 16 for cooling purposes, and finally out of the airframe through the previously discussed annular exhaust passage 25 which may be provided around the engine exhaust nozzle 24 and, where provided, through overboard exhaust openings such as 26 in the fuselage skin 12.

Air from the lower hose 58 may be disposed of in a fashion similar to that described immediately above, or it may profitably be conducted through the lower hose 58 and any needed branches thereof to airframe and/or engine parts, such as the engine accessory 73, which may especially need the protection from overheating afforded by a continuous stream of cooling air, examples of such including airframe structure exposed to severe heat, or an electrical generator, or a hydraulic actuator located where, without a cooling airflow, temperatures would become prohibitively high. The engine accessory 73 may receive an airflow through the hose segment 74 attached to the accessory 73 and attachable to the lower hose 58 or a branch thereof. The received airflow is discharged from the accessory 73 into the engine compartment 11 through a series of openings 75 in an exterior surface of the accessory 73. Thus, after flowing through or around the cooled areas and items of equipment, the air from the lower hose 58 may conveniently pass into the engine compartment 11 and thence overboard through the exhaust passage 25 and (where used) through the opening or openings 26.

Where, for a two-zone engine installation, the intermediate bulkhead 21 is installed in the fuselage 10, the forward section 19 of the engine compartment 11 and the forward section 17 of the engine 16 may be cooled by air passed into the compartment forward section 19 through the upper hose 57 and air release fitting 63 and out of the forward section 19, after circulation therethrough, through an overboard exhaust opening 26 in the fuselage skin 12 forward of the intermediate bulkhead 21. The aft section 20 of the engine compartment 11 may be cooled by means of any one of a number of possible arrangements, a simple and practical one of which is to provide on the intermediate bulkhead 21 an air release fitting 64 whose form and arrangement is similar to that of the equivalent fitting 63 on the forward bulkhead 14, the lower hose 58 being attached by a clamp 65 to the intermediate bulkhead air release fitting 64. Air from the lower hose 58 thus is released into the aft section 20 of the compartment 11 through the fitting 64, circulates through the compartment aft section 20 and around the engine aft section 18, and finally passes overboard through the annular passageway 25 and through any overboard exhaust openings similar to the opening 26 which it may be found expedient to provide in the compartment aft section 20. Cooling air for other specific locations or items of equipment in either compartment 19, 20 may be taken from hoses branching from the upper and lower hoses 57, 58, and other vessel openings and nipples similar to 55 or 56 and 59 or 60 may of course be added, if needed, for attaching still other hoses to the vessel 48.

While only one embodiment of the invention has been shown, together with several modifications thereof, in the accompanying drawings, it will be evident that still other modifications are possible in the arrangement and construction of the components of the means for improving total pressure distribution and value in air supplied by a duct to a jet engine without departing from the scope of the invention.

I claim:

1. In combination with an aircraft comprising a fuselage having mounted therein a relatively long air duct and a jet engine, said engine having a compressor face and being supplied with combustion air by said duct and said duct having an upstream end provided with a ram inlet opening, an arrangement for improving total pressure distribution and value in air flowing via said duct to said engine comprising: air-receiving means on said engine, said air-receiving means having an upstream end; a rearward portion of said duct extending well forwardly of said engine and having a wall enclosing a passage defined solely by said wall throughout at least some of the length of said duct rearward portion, said duct rearward portion having a downstream end relatively narrowly but substantially spaced from the upstream end of said air-receiving means of said engine to define therebetween a first opening communicating between the interior and exterior of said duct, said opening being located upstream of said compressor face and spaced therefrom by an interval less than half the diameter of said duct rearward portion at said downstream end of the latter; a compartment in said fuselage, said compartment enclosing the upstream end of said engine and said downstream end of said duct portion; and an exterior surface of said aircraft provided with a second opening, said second opening communicating between said compartment and the exterior of said aircraft, whereby through said first opening, compartment, and second opening, peripheral, lower-velocity air is removed from ram airflow through said duct and discharged from said aircraft.

2. In combination with an aircraft provided with an air duct and a jet engine having a compressor face, said duct and engine being mounted at least in part in a fuselage compartment thereof, said duct having a wall and a ram inlet opening, an apparatus for improving total pressure distribution and value in air flowing via said duct to said engine, said apparatus comprising: combustion air receiving means on said engine, said air-receiving means having an upstream end; a rearward portion of said duct extending well forwardly of said engine and enclosing a passage defined solely by said duct wall throughout at least some of the length of said duct rearward portion; a downstream end on said duct rearward portion connected to said upstream end of said air-receiving means; at least one circumferentially disposed opening through said duct wall, said opening being located upstream of said compressor face and spaced therefrom by an interval less than half the diameter of said duct rearward portion at said downstream end of the latter; air disposal means including an exterior surface of said aircraft pierced by an opening communicating with air outside said aircraft; and air conducting means comprising a passageway in said aircraft communicating with said at least one duct wall opening and with said air disposal means, whereby, through said air conducting means, air disposal means, and at least one opening in said duct wall, peripheral, lower-velocity air is removed from ram airflow in said duct immediately upstream of said compressor face of said engine and discharged from said aircraft.

3. In combination with an aircraft provided with an air duct and a jet engine having a compressor face, said duct and engine being mounted at least in part in a fuselage compartment thereof, said duct having a wall and a ram inlet opening, an apparatus for improving total pressure distribution and value in air flowing via said duct to said engine, comprising: combustion air-receiving means on said engine, said air-receiving means having an upstream end; a rearward portion of said duct extending well forwardly of said engine and enclosing a passage defined solely by said duct wall throughout at least some of the length of said duct rearward portion; a downstream end on said duct rearward portion connected to said upstream end of said air-receiving means; a circumferentially disposed series of openings through said duct wall immediately upstream of said engine compressor face and spaced therefrom by an interval less than half the diameter of said downstream end of said duct rearward portion; air disposal means comprising an exterior surface of said aircraft pierced by an opening communicating with air outside said aircraft; and air conducting means comprising a passageway in said aircraft communicating with said series of openings through said duct wall and with said air disposal means, whereby, through said air conducting means and air disposal means and through said series of openings in said duct wall, peripheral, lower-velocity air is removed from ram airflow in said duct and discharged from said aircraft.

4. In combination with an aircraft comprising a fuselage having an interior cavity and having an air duct and a jet engine mounted at least in part in said cavity, said engine having a compressor face and being supplied with air by said duct and said duct having a ram inlet opening, an apparatus for improving total pressure distribution and value in air flowing via said duct to said engine comprising: combustion air-receiving means on said engine, said air-receiving means having an upstream end; a rearward portion of said duct extending well upstream of said engine; a downstream end on said duct portion narrowly but substantially separated from said upstream end of said air-receiving means of said engine to define therebetween a circumferentially disposed opening communicating between the interior and the exterior of said duct, said opening being located upstream of said compressor face and spaced therefrom by an interval less than half the diameter of said duct rearward portion at said downstream end of the latter; an annular vessel covering said circumferentially disposed opening, the interior of said vessel having communication with said circumferentially disposed opening and said vessel having at least one aperture providing communication between the interior of said vessel and said interior cavity of said aircraft; and air disposal means including an exterior surface of said aircraft having therein at least one opening communicating with the exterior of said aircraft with said interior cavity, whereby, through said circumferentially disposed opening, vessel, interior cavity, and air disposal means, peripheral, lower-velocity air is removed from ram airflow issuing from said duct and passed overboard.

5. In combination with an aircraft having a fuselage compartment and carrying an air duct and a jet engine having a compressor face, said duct having an upstream end provided with a ram inlet opening, an apparatus for improving total pressure distribution and value in air flowing via said duct to said engine, comprising: a rearward portion of said duct having a wall and extending well forwardly of said engine, said rearward portion having a downstream end; a connection of said downstream end of said duct rearward portion to said engine in a location in the region of said compressor face of said engine and lying within said compartment; a vessel exteriorly mounted on said duct rearward portion at said connection thereof to said engine, said vessel being disposed circumferentially of said duct and having a first opening closed by said duct wall, said vessel further having a second opening communicating with said compartment; and at least one opening through said duct wall into said first opening of said vessel, said at least one opening through said duct wall being spaced forwardly of said engine compressor face by an interval less than half the diameter of said downstream end of said duct rearward portion; whereby, through said vessel and said openings in said duct wall and vessel, peripheral, lower-velocity air is removed from ram airflow in said duct and discharged into said compartment.

6. In combination with an aircraft comprising a fuselage having an interior cavity and an air duct and a jet engine having a compressor face, said duct and engine being mounted at least in part in said cavity, said duct having a wall and a ram inlet opening, an apparatus for improving total pressure distribution and value in air flowing through said duct to said engine, comprising: combustion air receiving means on said engine, said air receiving means having an upstream end; a rearward portion of said duct extending well forwardly of said engine and enclosing a passage defined solely by said wall throughout at least some of the length of said duct rearward portion; a downstream end on said duct rearward portion connected to said upstream end of said air receiving means; a vessel exteriorly mounted on said duct rearward portion at said downstream end thereof, said vessel having an inlet opening closed by an exterior surface of said duct wall and further having an outlet opening; at least one opening through said duct wall into said inlet opening of said vessel for allowing airflow from said duct to said vessel around at least a considerable percentage of the total perimeter of said duct, said at least one opening through said duct wall being spaced forwardly of said engine compressor face by an interval less than half the diameter of said downstream end of said duct rearward portion; and air conducting means comprising a passageway communicating with said second opening of said vessel, whereby, through said vessel and air conducting means and through said openings in said vessel and duct wall peripheral lower-velocity air is removed from ram airflow in said duct and discharged through said passageway.

7. In combination with an aircraft provided with a jet engine having a compressor face and further provided with an air duct supplying combustion air to and extending forwardly of said engine, said air duct having a wall enclosing a passage defined solely by said wall throughout at least some of the length of said duct, said duct having a forward end defining a ram inlet opening and being of such length that friction of air flowing in said duct along and against said wall significantly lowers the velocity of peripheral airflow relative to central airflow in said duct before said peripheral airflow reaches said engine, an arrangement for improving total pressure distribution and value in air flowing via said duct to said engine, comprising: air receiving means on said engine, said air receiving means having an upstream end; a downstream end on said duct, said downstream end being relatively narrowly but substantially spaced from said upstream end of said air receiving means to define therebetween a first opening communicating between the interior and exterior of said duct at a location spaced forwardly of said compressor face by less than half the diameter of said downstream end of said duct; and an exterior surface of said aircraft provided with a second opening communicating with said first opening, whereby, through said first and second openings, peripheral, lower-velocity air is removed from ram airflow in said duct and discharged from said aircraft.

8. In combination with an aircraft provided with a jet engine having a compressor face and further provided with an air duct supplying combustion air to and extending forwardly of said engine, said air duct having a wall enclosing a passage defined solely by said wall throughout at least some of the length of said duct, said duct having a forward end defining a ram inlet opening and being of such length that friction of the air flowing in said duct along and against said wall significantly lowers the velocity of peripheral airflow relative to central airflow in said duct before said peripheral airflow reaches said engine, an arrangement for improving total pressure distribution and value in air flowing via said duct to said engine comprising: air-receiving means on said engine, said air-receiving means having an upstream end; a downstream end on said duct connected to said upstream end of said air-receiving means; at least one opening through said duct wall for providing communication between the interior and exterior of said duct around at least a considerable percentage of the periphery of said duct, said at least one opening being spaced forwardly of said compressor face by an interval less than half the diameter of said downstream end of said duct; and an exterior surface of said aircraft provided with a second opening communicating with said at least one opening through said duct wall, whereby through said at least one opening through said duct wall and through said second opening, peripheral, lower-velocity air is removed from ram airflow in said duct and discharged from said aircraft.

9. In combination with an aerial vehicle having an interior in which is housed a jet engine with a compressor face and a forwardly extending central body having a forward end, said aircraft further having an air inlet duct having a wall enclosing and extending forwardly of said central body, means for improving total pressure of air flowing via said duct to said engine comprising: at least one opening through said air duct wall for providing communication between the interior and exterior of said duct around at least a considerable percentage of the periphery of said duct, said at least one opening being located forwardly of said compressor face and rearwardly of said forward end of said central body; and means for providing communication between said at least one opening and the exterior of said vehicle.

References Cited in the file of this patent

UNITED STATES PATENTS

| | | |
|---|---|---|
| 2,474,068 | Sammons et al. | June 21, 1949 |
| 2,589,945 | Leduc | Mar. 18, 1952 |
| 2,599,879 | Walker | June 10, 1952 |
| 2,631,796 | Williamson et al. | Mar. 17, 1953 |
| 2,660,858 | Leichty | Dec. 1, 1953 |
| 2,812,912 | Stevens et al. | Nov. 12, 1957 |